(12) United States Patent
Rosati et al.

(10) Patent No.: US 9,286,602 B2
(45) Date of Patent: Mar. 15, 2016

(54) SECURE FINANCIAL TRANSACTIONS

(75) Inventors: Anthony Rosati, Ottawa (CA); Matthew John Campagna, Ridgefield, CT (US); Gregory Marc Zaverucha, Missisauga (CA); Scott Alexander Vanstone, Campbellville (CA)

(73) Assignees: BlackBerry Limited, Waterloo, Ontario (CA); Certicom Corp., Mississauga, Ontario (CA)

( * ) Notice: Subject to any disclaimer, the term of this patent is extended or adjusted under 35 U.S.C. 154(b) by 55 days.

(21) Appl. No.: 13/423,014

(22) Filed: Mar. 16, 2012

(65) Prior Publication Data

US 2012/0239777 A1  Sep. 20, 2012

Related U.S. Application Data

(60) Provisional application No. 61/454,485, filed on Mar. 18, 2011, provisional application No. 61/454,837, filed on Mar. 21, 2011.

(30) Foreign Application Priority Data

Aug. 19, 2011 (WO) ................ PCT/CA2011/050509

(51) Int. Cl.
| | |
|---|---|
| G06Q 20/12 | (2012.01) |
| H04W 4/24 | (2009.01) |
| H04L 9/08 | (2006.01) |
| H04L 9/14 | (2006.01) |
| G06Q 20/20 | (2012.01) |
| G06Q 20/32 | (2012.01) |
| G06Q 20/38 | (2012.01) |
| H04L 29/06 | (2006.01) |

(Continued)

(52) U.S. Cl.
CPC .............. *G06Q 20/12* (2013.01); *G06Q 20/20* (2013.01); *G06Q 20/32* (2013.01); *G06Q 20/3276* (2013.01); *G06Q 20/3825* (2013.01); *H04L 9/0838* (2013.01); *H04L 9/14* (2013.01); *H04W 4/24* (2013.01); *H04L 63/0442* (2013.01); *H04L 63/18* (2013.01); *H04L 2209/72* (2013.01); *H04M 15/48* (2013.01); *H04W 12/02* (2013.01)

(58) Field of Classification Search
CPC .................................................. G06Q 20/3825
USPC ............................................ 380/30; 713/176
See application file for complete search history.

(56) References Cited

U.S. PATENT DOCUMENTS

| | | | | |
|---|---|---|---|---|
| 5,214,702 | A | * | 5/1993 | Fischer ........................ 380/30 |
| 7,249,259 | B1 | | 7/2007 | Vanstone et al. |

(Continued)

OTHER PUBLICATIONS

Schneier, Bruce. Applied Cryptography: protocols, algorithms, and source code in C, 1996, pp. 41-43. QA76.9 .A25S35.*

(Continued)

*Primary Examiner* — Jason K. Gee
*Assistant Examiner* — Zhimei Zhu
(74) *Attorney, Agent, or Firm* — Fish & Richardson P.C.

(57) ABSTRACT

A method of securely communicating a message for a financial transaction from a first correspondent to one or more recipients. The method comprises dividing the message into at least two portions. Each portion is intended for a recipient. Each portion intended for receipt by one of the recipients is encrypted with that recipient's public key. The message is signed and transmitted to one of the recipients to enable the recipient to verify the message and further transmit the message to a further recipient.

12 Claims, 7 Drawing Sheets

(51) Int. Cl.
  *H04W 12/02*  (2009.01)
  *H04M 15/00*  (2006.01)

(56) References Cited

U.S. PATENT DOCUMENTS

| | | | |
|---|---|---|---|
| 7,877,610 B2 | 1/2011 | Vanstone et al. | |
| 2009/0048953 A1* | 2/2009 | Hazel et al. | 705/35 |
| 2009/0100267 A1 | 4/2009 | Brown et al. | |
| 2011/0022837 A1* | 1/2011 | Stevens | 713/155 |
| 2012/0197742 A1* | 8/2012 | Johnson | 705/16 |
| 2012/0239930 A1* | 9/2012 | Zaverucha et al. | 713/168 |

OTHER PUBLICATIONS

AES and A.J. Menezes, P.C. van Oorschot and S.A. Vanstone. Handbook of Applied Cryptography, CRC Press, 1997, ISBN 0-8493-8523-7 §7.2.2.

NIST SP 800-108, Recommendation for Key Derivation Using Pseudorandom Functions, National Institute of Standards and Technology, Nov. 2007.

Federal Information Processing Standards Publication (FIPS PUB) 180-2. Specifications for the Secure Hash Standard, 2002.

ANSI Draft X9.92-2007-02-21: Public Key Cryptography for the Financial Services Industry, Digital Signature Algorithms Giving Partial Message Recovery Part 1: Elliptic Curve Pintsov-Vanstone Signatures (ECPVS), Accredited Standards Committee X9, Inc., 2007.

M. Jakobsson, K. Sako, and R. Impagliazzo. Designated Verifier Proofs and Their Applications. In Proceedings of Eurocrypt'96, LNCS 1070 (1996), 143-154.

International Preliminary Report on Patentability issued in International Application No. PCT/CA2011/050509 on Sep. 24, 2013; 7 pages.

Extended European Search Report issued in European Application No. 11861457.7 on Jan. 8, 2015; 4 pages.

* cited by examiner

SECURE FINANCIAL TRANSACTIONS

CROSS REFERENCE TO RELATED APPLICATIONS

The present application claims the benefit of PCT Application No. PCT/CA2011/050509 filed Aug. 19, 2011, which claims the benefit of U.S. Provisional Patent Application No. 61/454,837 filed Mar. 21, 2011 and U.S. Provisional Patent Application No. 61/454,485 filed Mar. 18, 2011. The present application also claims the benefit of U.S. Provisional Patent Application No. 61/454,837 filed Mar. 21, 2011 and U.S. Provisional Patent Application No. 61/454,485 filed Mar. 18, 2011. The entire contents of PCT Application No. PCT/CA2011/050509 filed Aug. 19, 2011 and U.S. Provisional Patent Application No. 61/454,837 filed Mar. 21, 2011 are hereby incorporated herein by reference.

TECHNICAL FIELD

The following relates to secured transmissions applied to financial transactions.

BACKGROUND

In today's ecommerce model the user places an order at a merchant's web site with his/her payment information. That information is passed to a payment gateway who transacts with the merchants acquiring and issuing bank to complete the transaction, i.e., make payment. In this model the user's payment information is available at the merchant's web site and at the payment gateway. This introduces the potential for fraud at many points in the system.

It is an object to mitigate or obviate the above-mentioned disadvantages.

BRIEF DESCRIPTION OF THE DRAWINGS

The features will become more apparent in the following detailed description in which reference is made to the appended drawings wherein.

DETAILED DESCRIPTION

Figures 5, 6:
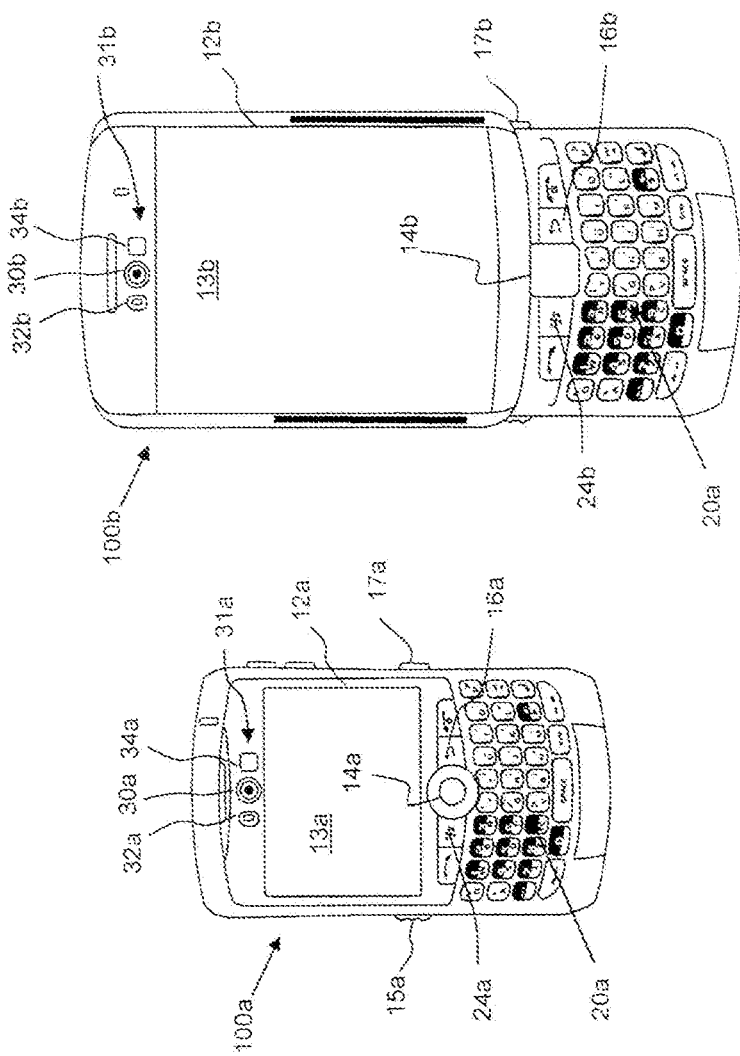
FIG. 5 is a schematic representation of a first implementation of a mobile device.
FIG. 6 is a schematic representation of a second implementation of a mobile device.

Referring to FIGS. 5 and 6, one example implementation of a mobile device 100a is shown in FIG. 5, and another example implementation of a mobile device 100b is shown in FIG. 6.

It will be appreciated that the numeral "100" will hereinafter refer to any mobile device 100, including the example implementations 100a and 100b, those example implementations enumerated above or otherwise. It will also be appreciated that a similar numbering convention may be used for other general features common among all figures such as a display 12, a positioning device 14, a cancel or escape button 16 and input device such as a keyboard 20.

Figure 2:
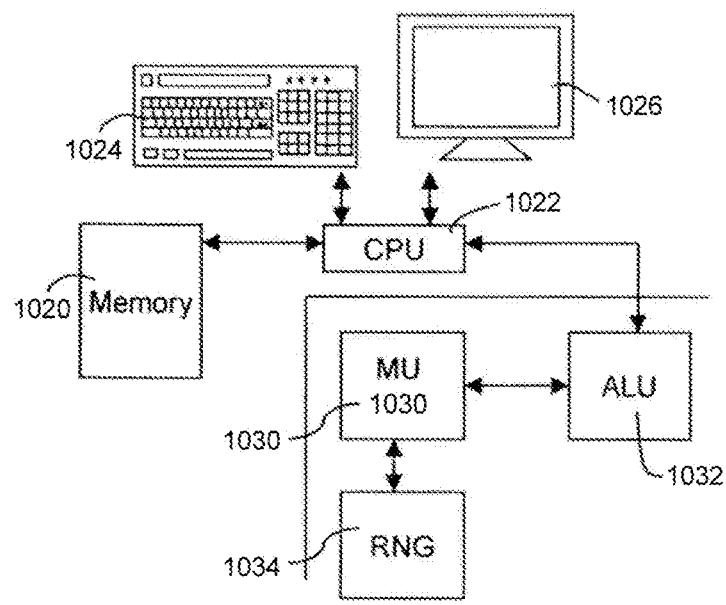
FIG. 2 is a representation of a cryptographic unit used in the system of FIG. 1.

The mobile device 100b shown in FIG. 5 includes a display 12a with a viewing area 13a and the cursor or view positioning device 14 shown in this example implementation is a trackball 14a. Positioning device 14 may serve as another input member and is both rotational to provide selection inputs to the main processor 102 (see FIG. 7) and can also be pressed in a direction generally toward housing to provide another selection input to the processor 102. Trackball 14a permits multi-directional positioning of the selection cursor 18 (see FIG. 8) such that the selection cursor 18 can be moved in an upward direction, in a downward direction and, if desired, permitted, or a combination thereof, in any diagonal direction. The trackball 14a is in this example situated on the front face of a housing for mobile device 100a as shown in FIG. 2 to enable a user to manoeuvre the trackball 14a while holding the mobile device 100a in one hand. The trackball 14a may serve as another input member (in addition to a directional or positioning member) to provide selection inputs to the processor 102 and can be pressed in a direction towards the housing of the mobile device 100b to provide such a selection input. It can be appreciated that the trackball 14a is only one example of a suitable positioning device 14. For example, a trackpad, touchscreen, OLED, or other input mechanism may equally apply.

The display 12 may include a selection cursor 18 that depicts generally where the next input or selection will be received. The selection cursor 18 may include a box, alteration of an icon or any combination of features that enable the user to identify the currently chosen icon or item. The mobile device 100a in FIG. 5 also includes a programmable convenience button 15a to activate a selected application such as, for example, a payment application. Further, mobile device 100a includes an escape or cancel button 16a, a menu or option button 24a and a keyboard 20a. The menu or option button 24a can be used to load a menu or list of options on the display 12a when pressed. In this example, the escape or cancel button 16a, the menu option button 24a, and a keyboard 20a may be disposed on the front face of the mobile device housing, while the convenience button 15a is disposed at the side of the housing. This button placement enables a user to operate these buttons while holding the mobile device 100 in one hand. The keyboard 20a is, in this example implementation, a standard QWERTY keyboard, however, it will be appreciated that reduced QWERTY or virtual keyboards (e.g. as provided by a touchscreen) may equally apply.

Figure 3:
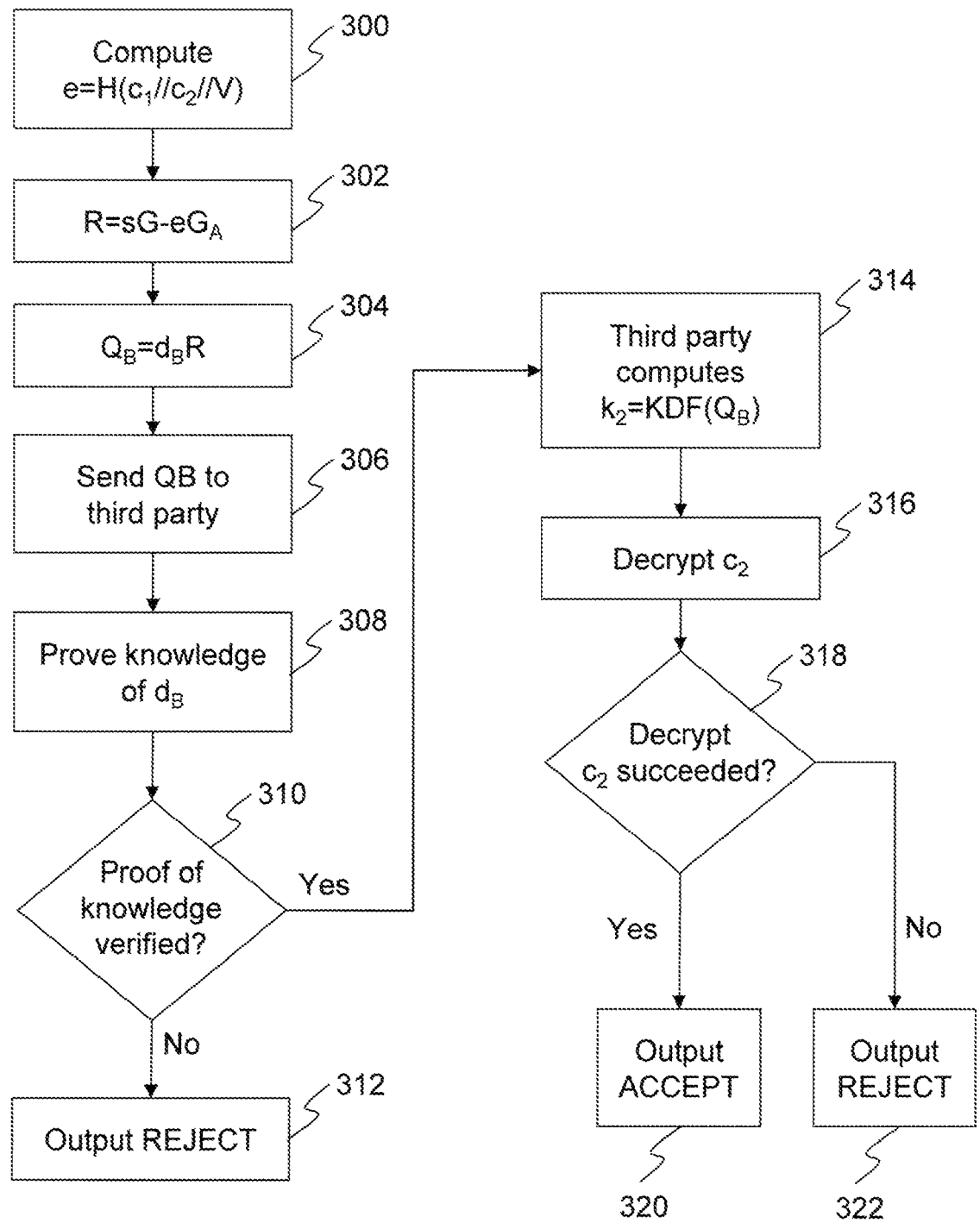
FIG. 3 is a flowchart illustrating a second correspondent converting and transferring a first correspondent's keyed PV signature to the third party.

The mobile device 100b shown in FIG. 6 includes a touchscreen display 12b with a viewing area 13b and the positioning device 14 in this example implementation is a trackpad 14b. The mobile device 100b also includes a menu or option button 24b, a cancel or escape button 16 and a convenience button 15b. The mobile device 100b, as illustrated in FIG. 3, includes a standard reduced QWERTY keyboard 20a. In this example implementation, the keyboard 20ba, positioning device 14b, escape button 16b and menu button 24b may be disposed on a front face of a mobile device housing.

It will be appreciated that for the mobile device 100, a wide range of one or more positioning or cursor/view positioning mechanisms such as a touch/track pad, a positioning wheel, a joystick button, a mouse, a touchscreen, a set of arrow keys, a tablet, an accelerometer (for sensing orientation, movements, or a combination thereof of the mobile device 100 etc.), OLED, or other whether presently known or unknown may be employed. Similarly, any variation of keyboard 20 may be used. It will also be appreciated that the mobile devices 100 shown in FIGS. 5 and 6 are for illustrative purposes only and various other mobile devices 100 are equally applicable to the following examples. Other buttons may also be disposed on the mobile device housing such as color coded "Answer" and "Ignore" buttons to be used in telephonic communications. In another example, the display 12 may itself be touch sensitive thus itself providing an input mechanism in addition to display capabilities.

To aid the reader in understanding the structure of the mobile device 100, reference will now be made to FIGS. 7 through 9.

Figure 7:
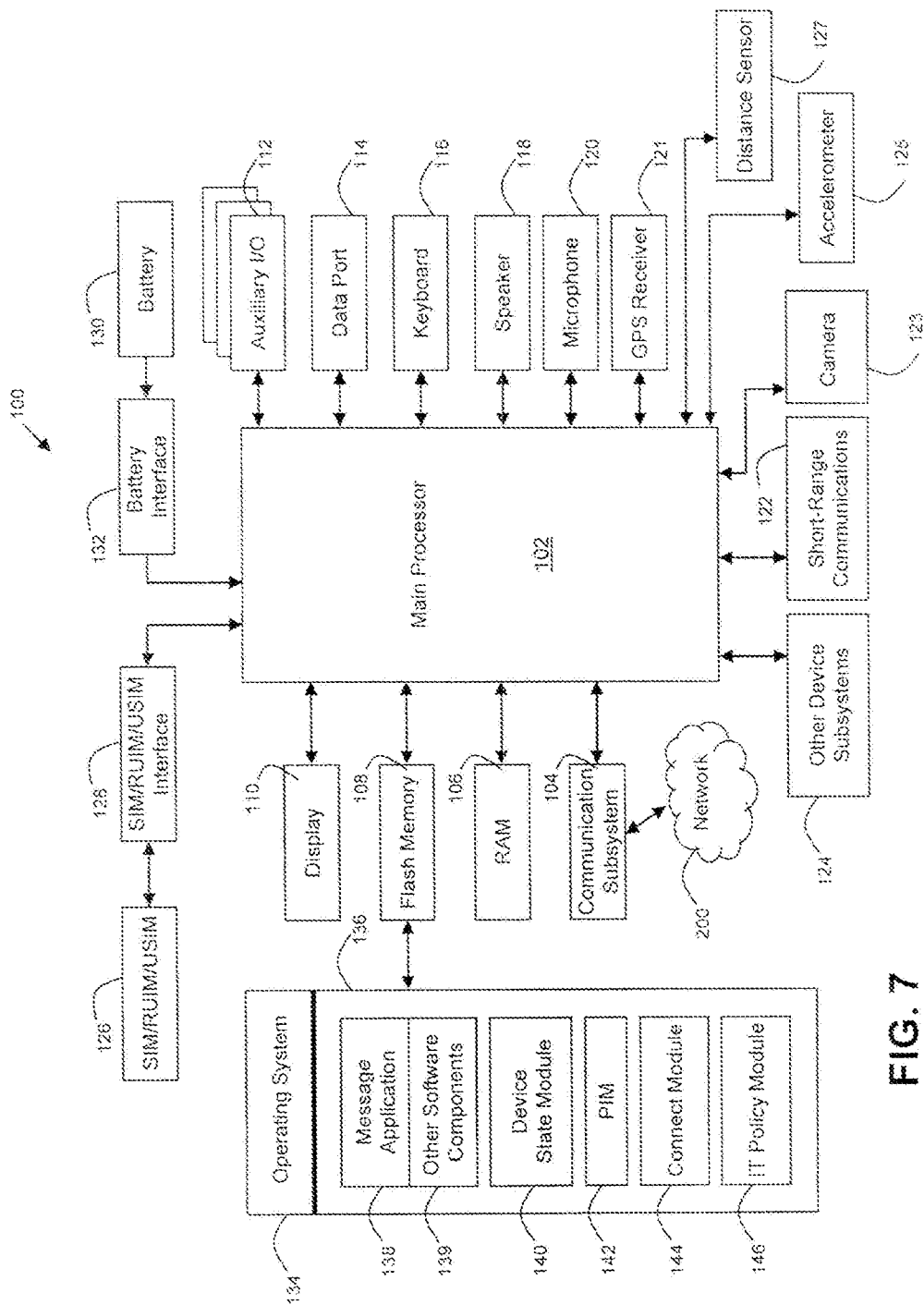
FIG. 7 is a block diagram of components of the mobile device.
Figure 8:
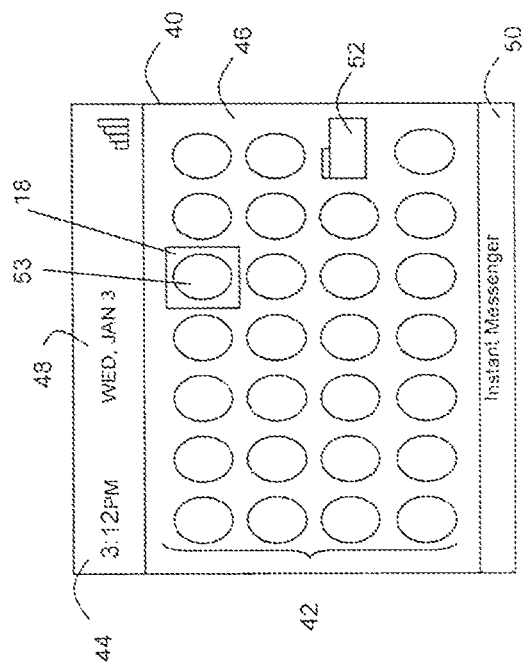
FIG. 8 is an example graphical user interface (GUI) of the mobile device.

Referring first to FIG. 7, shown therein is a block diagram of an example implementation of a mobile device 100. The mobile device 100 includes a number of components such as a main processor 102 that controls the overall operation of the mobile device 100. Communication functions, including data and voice communications, may be performed through a communication subsystem 104. The communication subsystem 104 receives messages from and sends messages to a wireless network 200. In this example implementation of the mobile device 100, the communication subsystem 104 may be configured in accordance with near field communications (NFC), the Global System for Mobile Communication (GSM) and General Packet Radio Services (GPRS) standards, which are used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example implementations described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, a camera 123, a accelerometer 125, a distance sensor 127 and other device subsystems 124. The display 110 can be a touch-screen display able to receive inputs through a user's touch.

The main processor 102 may comprises a secure processor. Alternatively, a separate secure processor may be provided.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after executing network registration or activation procedures have been completed. Network access may be associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 may be to be inserted into a SIM/RUIM/USIM interface 128 in order to communicate with a network. Without the component 126, the mobile device 100 may not fully be operational for communication with the wireless network 200. Once the SIM/RUIM/USIM 126 is inserted into the SIM/RUIM/USIM interface 128, it is coupled to the main processor 102.

The mobile device 100 is typically a battery-powered device and includes a battery interface 132 for receiving one or more rechargeable batteries 130. In at least some example implementations, the battery 130 can be a smart battery with an embedded microprocessor. The battery interface 132 may be coupled to a regulator (not shown), which assists the battery 130 in providing power to the mobile device 100. Although current technology makes use of a battery, future technologies such as micro fuel cells may provide the power to the mobile device 100.

The mobile device 100 also includes an operating system 134 and software components 135 to 146 which are described in more detail below. The operating system 134 and the software components 136 to 146 that may be executed by the main processor 102 are typically stored in a persistent store such as the flash memory 108, which may alternatively be a read-only memory (ROM) or similar storage element (not shown). The flash memory 108 may include a secure portion that may be accessible only to trusted applications. The secure portion of the flash memory 108 may be accessible to the secure portion of the main processor 102.

Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that controls basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data may be stored in persistent memory, such as the flash memory 108, so that the data may not be lost when the mobile device 100 may be turned off or loses power. A PIM 142 includes functionality for organizing and managing data items of interest to the user, such as e-mail, contacts, calendar events, and voice mails, and may interact with the wireless network 200. A connect module 144 implements the communication protocols that may be used for the mobile device 100 to communicate with the wireless infrastructure and any host system, such as an enterprise system, that the mobile device 100 may be authorized to interface with. An IT policy module 146 receives IT policy data that encodes the IT policy, and may be responsible for organizing and securing rules such as the "Set Maximum Password Attempts" IT policy.

Figure 9:
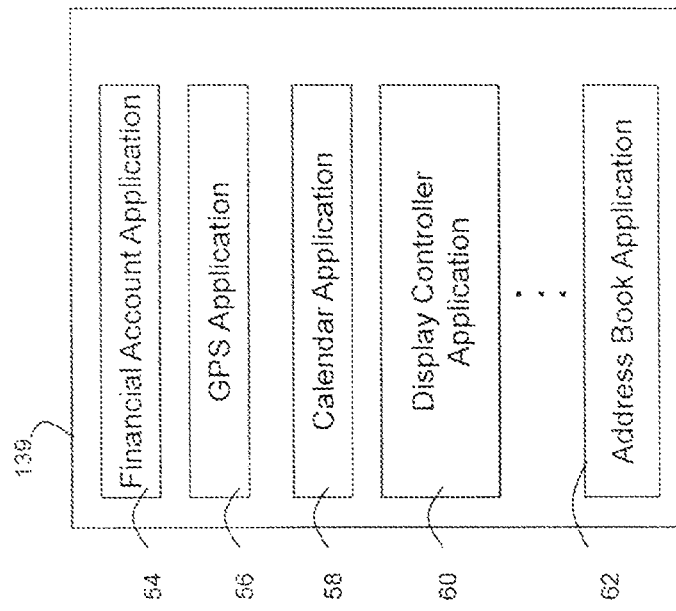
FIG. 9 is an example set of applications executable on the mobile device.

Referring to FIG. 9, the software applications also include a financial account application 54. Financial account application 54 enables a user of the mobile device 100 to store financial account information, on, for example, the secure portion of flash memory 108, on the mobile device 100. Alternatively, the financial account application 54 may enable the user to provide financial account information to a trusted third party for storage at a remote location, such as on the cloud, for example. Financial account information may include credit/debit card information and banking information along with a user's private keying information. The user may provide financial account information by inputting the information to the financial account application 54 by keyboard 116.

Other types of software applications or components 139 can also be installed on the mobile device 100. These software applications 139 can be pre-installed applications (i.e. other than message application 138) or third party applications, which may be added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals may be output to the speaker 118, and signals for transmission may be generated by the microphone 120. Although voice or audio signal output may be accomplished primarily through the speaker 118, the display 110 can also be used to provide additional information such as the identity of a calling party, duration of a voice call, or other voice call related information.

Figure 1:
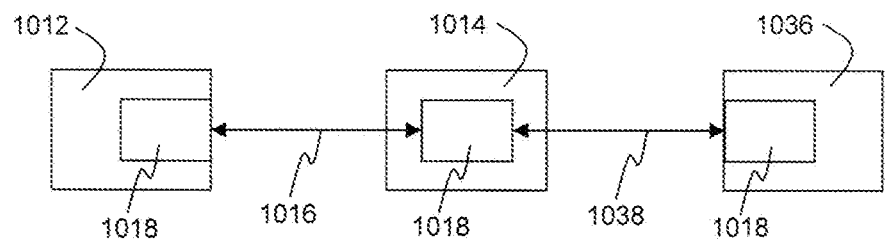
FIG. 1 is a schematic representation of a data communication system.

Referring now to FIG. 1, a data communication system 1010 includes a pair of correspondents 1012, 1014 connected by a communication link 1016 and one or more third party 1036 connected to at least the second correspondent 1014, or to another third party 1036, by a further communication link 1038. The correspondents 1012, 1014 are computing devices, such as a personal computer, personal digital assistant, smart phone, cellular phone, ATM, Point-of-Sale device, server, entertainment system component, or other such device having a computing capability and provided to exchange digital information with other correspondents. The correspondent 1012 could alternatively be a smart card or other processor-enabled computerized wallet.

Correspondent 1012 may be a mobile device as previously described. Correspondent 1014 may, for example, be a computer operated by a merchant.

The communication links 1016, 1038 may each be a telephone link, wireless or landline, local area network (LAN), RF link, near field communications (NFC) or other such link provided to transfer information between the correspondents. Although shown for illustrative purposes as direct connection between correspondents 1012, 1014, it will be appreciated that the communication links 1010, 1038 may be part of a more extensive network and that the link may be routed through multiple correspondents in passing from correspondent 1012 to correspondent 1014 to third parties 1036.

Each of the correspondents 1012, 1014 may be similar in operation when communicating over the link 1016 and therefore only one will be described in detail.

Each of the third parties 1036 may be provided with a device similarly configured to the correspondents 1012, 1014. The third parties 1036 may be considered to be additional second correspondents, as will be understood from the following.

The cryptographic unit 1018 may be provided to manage secure communications between the correspondents 1012, 1014 over the communication link 1016. The cryptographic unit 1018 includes a secure memory 1030, which may be part of the memory 1020 or a separate memory module, and an arithmetic logic unit (ALU), 1032, that operates under the control of the processor 1022 to perform arithmetic operations necessary to implement a chosen cryptographic protocol. The processor 1022 includes one or more instruction sets to implement respective protocols.

It will be appreciated that any module or component exemplified herein that executes instructions may include or otherwise have access to computer readable media such as storage media, computer storage media, or data storage devices (removable, non-removable, or a combination thereof) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the cryptographic unit or accessible or connectable thereto. Any application or module herein described may be implemented using computer readable/executable instructions that may be stored or otherwise held by such computer readable media.

The memory 1020 stores the parameters of the cryptosystem implemented by the cryptographic unit 1018. In the present example, the cryptosystem may be a public key elliptic curve cryptosystem in which cryptographic protocols may be implemented based on the intractability of the discrete log problem in an elliptic curve group defined over a finite field. The memory 1020 therefore stores the parameters of the curve, such as the generator point G and the order, n, of the elliptic curve group E. It may be appreciated that the examples provided herein refer to an elliptic curve group E, but the same principles could also apply to other groups, such as those for which the discrete logarithm problem is known to be hard to solve (e.g. in prime order subgroups of $Z_p^*$, where p is a prime).

The cryptographic unit 1018 also includes a random number generator (RNG) 1034, whose output may be provided to memory 30 for use by the ALU 1032. The memory 1030 also stores securely an ephemeral private key x that may be a bit string derived from the output of the random number generator 1034.

One aspect is a method of securely communicating a message for a financial transaction from a first correspondent to a second correspondent and one or more third parties, the method comprising: dividing said message into at least two portions, each said portion being intended for said second correspondent or a particular one of said third parties; encrypting each said portion intended for receipt by a respective one of said third parties with a public key of the respective one of said third parties; signing said message; and transmitting said message to said second correspondent to enable said second correspondent to verify said message and further transmit said message to at least one of said third parties. The third parties may be considered as additional second correspondents.

Figure 10:
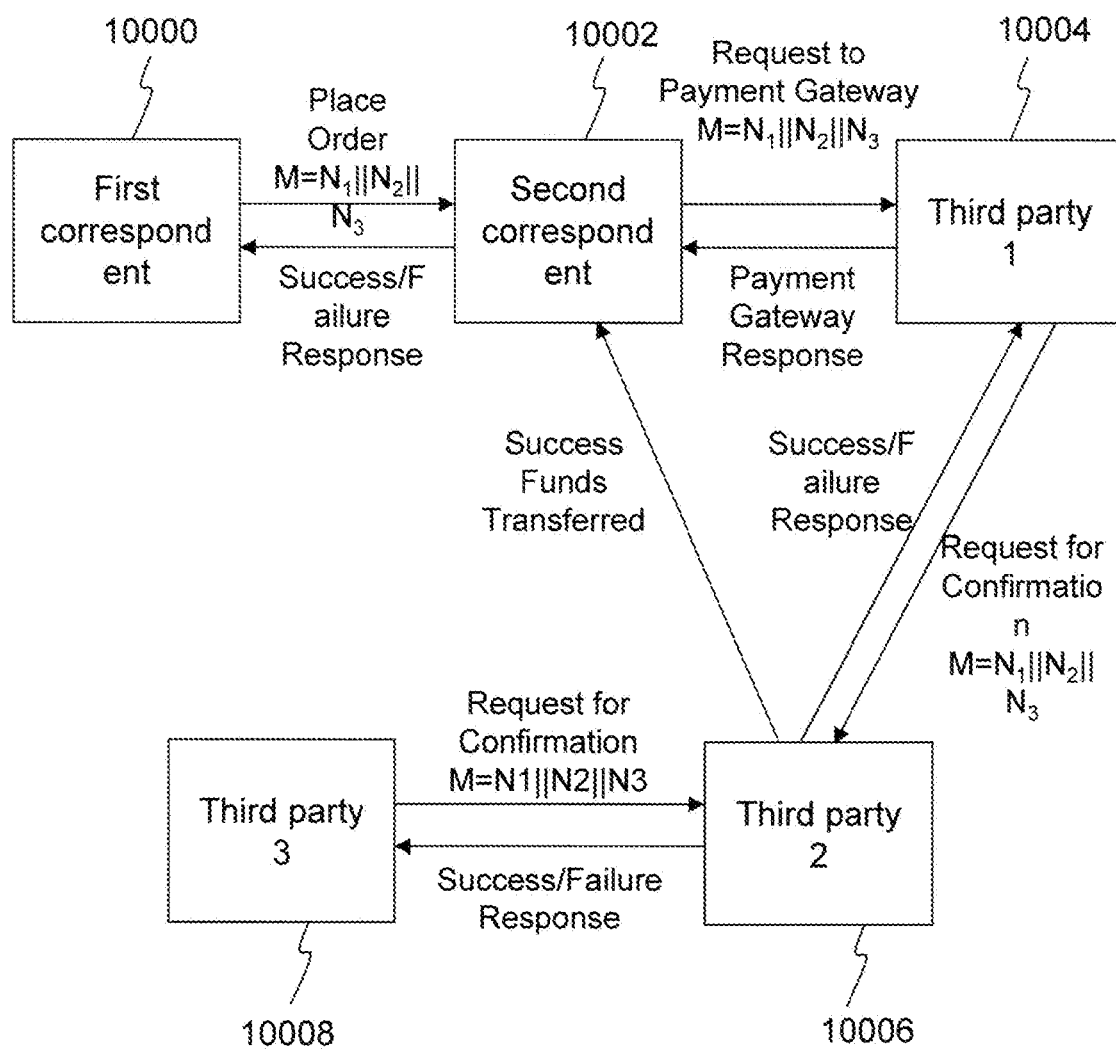
FIG. 10 is a block diagram of a transaction.

Referring now to FIG. 10, a first correspondent (10000) may be a mobile device, a second correspondent (10002) may be a computer operated by a merchant, a first third party (10004) may be a payment gateway, a second third party (10006) may be a merchant acquiring bank and a third third party (10008) may be an issuing bank. Mobile devices can be used to make financial transactions with the merchant, provided a transaction message can be securely communicated from the mobile device to the payment gateway and to the merchant acquiring bank.

Portions of the transaction message may be selectively encrypted with the private key of only the party or parties that may use the respective portion. The system also has a non-repudiation feature that can be audited at any point along the way. One method by which to achieve this is with an extension to the ECC signature scheme PV signatures that can be referred to as keyed PV signatures, which is described herein.

It should be appreciated that cryptographic schemes other than keyed PV can be applied provided that such cryptographic scheme may be operable to provide a message that can be divided into a plaintext portion and one or more hidden portions, each of which may be selectively decryptable by one or more third parties. For example, United States Patent Application Publication No. US 2009/0100267 entitled "Signatures with Confidential Message Recovery", which is incorporated herein by reference, describes another cryptographic scheme enabling the system and method herein.

The system and method described herein:
1. may be independent of the transport, i.e., network layer security, and therefore can run in any network environment where server components can be separated,
2. enables data to be revealed only to parties who need it, and kept confidential from all others, unlike in current ecommerce systems, and
3. enables all components of the transaction to be audited by a third party, i.e., signatures verified, at a later date for dispute resolution.

The system and method can be adapted for internet payment, such as to a web merchant when the mobile device may be linked to the Internet. For example, a user can access a web browser on the mobile device to access a web merchant and can pay for items purchased from the web merchant using the methods described herein.

The system and method can also be adapted for payment at a brick and mortar merchant location. For example, the mobile device may be NFC enabled and the brick and mortar merchant location may be equipped with a NFC-enabled reader.

Referring therefore to FIG. 10, a purchasers is provided with an NFC enabled mobile device (being the first correspondent) that may be configured to store financial account information or retrieve financial account information from the cloud. The brick and mortar merchant is provided with an NFC enabled reader (being the second correspondent).

The first correspondent comprises a secure processor (trusted execution environment) and secure storage (trusted storage) where private information such as user credentials, payment information and keying may be stored and securely accessible using a financial account application. Digital signing takes place in the secure processor. Secure credit card processing protocols, for example, can be executed by the secure processor. The first correspondent can therefore present its NFC mobile device (as a credit card) to an NFC reader at a merchant site. It should be appreciated that the first correspondent could provide debit or other forms of financial accounts rather than, or in addition to, credit card accounts.

In accordance with an ECC signature scheme, keyed PV provides true confidentiality for parts of the information, i.e., transaction information, as it flows through the network to third parties, including the payment gateway, merchant acquiring bank, and issuing bank. The confidential component(s) can only be uncovered by specific and intended third parties. The signature can be verified at any point along the way. Further non-repudiation may be built in so that the signing party cannot deny making the transaction.

Referring again to FIG. 10, keyed PV allows the signer (the first correspondent) to create a signature for the second correspondent composed of the message $M=N_1\|N_2\|N_3$ where $N_1$ may be visible, $N_2$ may be encrypted with the public key of the payment gateway, and $N_3$ may be encrypted with the public key of the issuing bank. N1 may also be encrypted so as to be recoverable by any party.

The message may further comprise additional components, including a visible component V.

Any party can verify that $N_1$ was signed by the first correspondent (with her public key) while the other components of the message may be encrypted. The merchant forwards the signed message M to the payment gateway, which knows the merchant acquiring bank from a pre-established relationship. The payment gateway can recover $N_2$ using its private key and verify that $N_1$ and $N_2$ were signed by the first correspondent. $N_2$ identifies the issuing bank, and the transaction details may still be encrypted under the issuing bank public key. Only the issuing bank can recover $N_3$ using its private key and can verify that the first correspondent signed $N_1$, $N_2$ and $N_3$ thus initiating the completion of the transaction. In this example the merchant has none of the first correspondent's transaction details, not even the issuing bank name. The payment gateway only knows the first correspondent's issuing bank. The issuing bank may be the only entity that can decipher the transaction details and complete the transaction.

The system and method further provide for refunds and dispute resolution. A receipt R can be composed by the payment gateway for the transaction between the first correspondent and the second correspondent. The receipt can be signed by the payment gateway that may be verifiable by any third party. R in this case may be visible by anyone. Alternatively R could be composed of $R_1\|R_2$ where $R_1$ may be visible (identifying a receipt for the first correspondent) and $R_2$ may be the hidden part (detailing the transaction details). The first correspondent can recover the hidden part.

Suppose, for example, that the first correspondent wants a refund and may be entitled to one. Keyed PV signatures can be constructed to accommodate this scenario. In this case, the first correspondent can convert the confidential portion R2 to be a visible part of the signed message R in such a way to allow a third party to verify that:
1. The payment gateway signed both the hidden and visible parts of the message,
2. The first correspondent was the intended recipient of the message, and
3. That the first correspondent converted the signature honestly.

Suppose, for example, that there is a dispute between the first correspondent and the second correspondent. Keyed PV signatures can be constructed to accommodate this scenario. The issuing bank (a third party) can to convert the confidential portion $N_3$ to be a visible part of the signed message M in such away to allow a third party to verify that
1. The first correspondent signed both the hidden and visible parts of the message, 2. The issuing bank was the intended recipient of the message, and
3. That the issuing bank converted the signature honestly.

The payment system may be based on PKI where payments may be encrypted and signed to protect the transaction details and allow for specific parts of the message to be recovered and verified by targeted third parties. Encrypted transactions may only be decrypted by specific parties such as the issuing bank. These transactions may not be available to the second correspondent thereby minimizing fraud.

The first correspondent may have the following inputs available to make payments (its private key and transaction details may be protected by some suitable method such as ewallet/secure element:

1. The first correspondent's (e.g., purchaser's) private key $d_A$; the first correspondent computes public key $G_A=d_A G$ using its ALU 1032;
2. The second correspondent's (e.g., merchant's) public key $G_{PG}=d_{PG}G$, which is computed by the second correspondent's ALU 1032.
3. The third party's (e.g., issuing bank's) public key $G_{IB}=d_{IB}G$.

One example for providing the above described functionality is now described in accordance with keyed PV.

The original Elliptic Curve Pintsov-Vanstone Signature scheme has been extended to the keyed Pintsov-Vanstone signature scheme (keyed PV, or kPV for short). Keyed PV is a signature scheme with confidential message recovery, where only the intended recipient may recover part of the message. This is in contrast to some digital signature schemes where the message is public, and anyone may verify the signature, given the signer's public key.

A PV scheme is described in commonly owned U.S. Pat. Nos. 7,249,259 and 7,877,610, which are incorporated herein by reference.

The PV signature scheme (and variants) may be instantiated using the group of points on an elliptic curve. Let $E(F_q)$ be the set of points on the elliptic curve E over the finite field with q elements. Each point has a pair of co-ordinates that are elements of the underlying finite field and satisfy the elliptic curve E. This set forms a group under a binary operation referred to as point addition. Typically, the set is selected to have a size l=rn, where n is a large prime and the co-factor r is a (relatively) small integer. A generator of the subgroup of order n is denoted G, and all group arithmetic will take place in this subgroup. By convention, additive notation is used, e.g., for the sum of two points P and Q we write P+Q, and scalar multiplication by an integer k is kP.

The signature schemes herein may be instantiated using any finite abelian group. For example, we could use a subgroup of Zp, the group of integers modulo a prime p. In this case the group order is p−1, and the generator will again generate a subgroup of order n, where n|p−1. It will be appreciated that the size of the subgroup, and primality of n are security requirements but not required to instantiate the scheme, i.e., one could instantiate the signature scheme using any subgroup, but it may not be secure.

Traditionally, arithmetic in subgroups of Zp is written multiplicatively, the product of two elements P and Q is PQ and the analogue of scalar multiplication by k is exponentiation, and denoted $P^k$.

In accordance with the keyed PV scheme, a message sent by a first correspondent to a second correspondent is divided into a first portion which is hidden and is recovered during verification, and a second portion which is visible and is required as input to the verification algorithm. The keyed PV scheme can be applied or repeated for each second correspondent or third party or both to which the first correspondent intends the message to be sent. Alternatively, the keyed PV scheme can be applied for a plurality of recipients. Such segmentation of the recoverable message extended to multiple directed messages may be described in United States Patent Application Publication No. US 2009/0100267, incorporated herein by reference.

A first signature component is generated by encrypting the first portion alone. An intermediate component is formed by combining the first component and the visible portion and cryptographically hashing them. A second signature component is then formed using the intermediate component and the signature comprises the first and second components with the visible portion.

A verification of the signature combines a first component derived from only from the hidden portion of the message with the visible portion and produces a hash of the combination. The computed hash is used together with publicly available information to generate a bit string corresponding to the hidden portion. If the required redundancy is present the signature is accepted and the message reconstructed from the recovered bit string and the visible portion.

Keyed PV allows a signer (the first correspondent) to choose one or more recipients (the second correspondent or any of the third parties or any combination thereof), and create a signature on a message $M=N_1\|N_2\|\ldots\|N_k\|V$, where V may be visible information or could be omitted or replaced by a predetermined string. Similarly, $N_1$ may be replaced by a predetermined string.

Any party may verify that $N_1$ and V were signed by the first correspondent, but each $N_2 \ldots N_k$ may be encrypted so that only the particular second correspondent or third party, as the case may be, may recover it.

While the following discussion describes $M=N_1\|N_2\|V$, it should be understood that segmentation of the recoverable message can be extended to multiple directed messages as described in United States Patent Application Publication No. US 2009/0100267 to provide for $N_3, \ldots N_k$.

The keyed PV scheme starts with a signer (the first correspondent), with key pair $(d_A, G_A)$ on an appropriate elliptic curve. This is the algorithm in which the first correspondent signs a message M=N1∥N2∥V, where N1 and V will be signed without confidentiality, and N2 is signed with confidentiality, so that only the second correspondent may recover N2 and verify that it was signed by the first correspondent.

During verification, the verifier (the second correspondent) will recover some $N'_i$, and must be sure that $N'_i=N_i$. Requiring that $N_i$ have sufficient redundancy is one way to address this issue: it allows $N'_i$ to be identified as belonging to a set of valid plaintexts. Given sufficient redundancy, it should be infeasible for a forger to produce a signature which satisfies all requirements, but has $N'_i \neq N_i$. An alternative way to recognize a decrypted message as valid is to use authenticated encryption. We call the N2 the hidden part of the message (which will be encrypted for the recipient) and (N1,V) the visible parts of the message (visible to anyone, authenticated by the signer).

Either or both of N1 and V may be substituted with a predetermined string, such as a null string, a predefined redundancy, or other predetermined string.

The first step in the keyed PV signature scheme may have some or all parties agree on a set of domain parameters that may be stored in the memory 1020. Sets of domain parameters can be agreed upon between each sender (signer) and receiver (verifier) pair, or can be agreed upon between the sender and a plurality of receivers, or any combination thereof. Therefore, if a plurality of receivers may be present, there may be multiple sets of domain parameters in use, and any sender/receiver pair may use the scheme if they have agreed on a particular set of parameters. These parameters include:

1. A suitable elliptic curve group of order n, with generator G (see SEC2: Recommended Elliptic Curve Domain Parameters version 2.0, Standards for Efficient Cryptography Group, 2000, which is incorporated herein by reference).
2. A symmetric key encryption function E, with corresponding decryption function D. An example may be AES in counter or CBC mode. See FIPS PUB 197 for details of AES and A. J. Menezes, P. C. van Oorschot and S. A. Vanstone. Handbook of Applied Cryptography, CRC Press, 1997, ISBN 0-8493-8523-7 §7.2.2, both of which are incorporated herein by reference, for information on modes of operation. We also note that the encryption function may be replaced with authenticated encryption, and the redundancy requirement removed. In the following we say decryption may be successful if the redundancy requirement is satisfied, or if the authenticated encryption algorithm decrypts without error.
3. A key derivation function, denoted KDF, which outputs keys suitable for use with E. Example KDFs may be given in NIST SP 800-108 (NIST SP 800-108, Recommendation for Key Derivation Using Pseudorandom Functions, National Institute of Standards and Technology, November, 2007), incorporated herein by reference.
4. A cryptographic hash function which maps arbitrary length inputs to fixed-length outputs. Example hash functions may be the SHA-2 family, see FIPS PUB 180-2 (Federal Information Processing Standards Publication (FIPS PUB) 180-2. Specifications for the Secure Hash Standard, 2002), incorporated herein by reference.
5. Encoding methods to communicate values (integers, group elements, etc.) between parties (an example encoding could be specified by ASN.1). The signer and verifier may also agree upon a common encoding of lists of values as bitstrings before hashing them (for example: 1) convert all values to octet strings, then 2) concatenate hash of the octet strings). As with hashing, an encoding may be used before deriving keys. With both the KDF and hash function, encoding may incorporate additional information such as the date.

For security of the scheme, the domain parameters may be chosen carefully. Further details on parameter choices may be available in the ASC X9.92 Draft (see ANSI Draft X9.92-2007-02-21: Public Key Cryptography for the Financial Services Industry, Digital Signature Algorithms Giving Partial Message Recovery Part 1: Elliptic Curve Pintsov-Vanstone Signatures (ECPVS), Accredited Standards Committee X9, Inc., 2007, incorporated herein by reference). Additionally for security, the signer and recipient may secure random number generators when generating keys and signing or converting messages. Going forward, we assume that all parties are in possession of the domain parameters.

Keyed PV Key generation by a first correspondent comprises:

1. Choose $d_A$ at random from $[0, \ldots, n]$ as an output of the random number generator 1034.
2. Compute $G_A = d_A G$ using the arithmetic logic unit 1032.
3. Output $(d_A, G_A)$ where $d_A$ may be the secret key and $G_A$ may be the public key. The secret key $d_A$ may be securely stored in the memory 1020

The first correspondent also has received the second correspondent's public key $G_B = d_B G$. A message M may be parsed into components $N_1$, $N_2$, and V so that $M = N_1 \| N_2 \| N_2 \| V$. A keyed PV signature generation by the first correspondent comprises:

1. Using the RNG 1034, choose r at random from $[0, \ldots, n]$ and compute, using the ALU 1032, $Q = rG$ and $Q_B = rG_B$.
2. Using the ALU 1032, construct key $k_1 = KDF(Q)$ and $k_2 = KDF(Q_B)$, where KDF is a key derivation function that takes as input a point, and generates an encryption key.
3. Using the ALU 1032, compute $c_1 = E(N_1, k_1)$, and $c_2 = E(N_2, k_2)$ where E is the encryption scheme specified by the domain parameters.
4. Using the ALU 1032, compute $h = Hash(c_1 \| c_2 \| V)$, where Hash is a suitable hash function, specified by the domain parameters.
5. Using the ALU 1032, convert h to an integer e.
6. Using the ALU 1032, calculate $s = r + e \cdot d_A \pmod{n}$.
7. Output $(s, c_1, c_2, V)$, which is the signature, to the second correspondent.

$Q_B = (rd_B)G$ may be a Diffie-Hellman value. The following algorithm performs a signature verification of a signed message $(s, c_1, c_2, V)$ and recovers $N_2$, when provided with the first correspondent's public key, and the second correspondent's private key $d_B$.

Given the signed message $(s, c_1, c_2, V)$, the first correspondent's public key $G_A$, and the second correspondent's private key $d_B$, signature verification can be performed by the second correspondent using the cryptographic unit at the second correspondent. Message recovery using the ALU 1032 comprises:

1. Compute $h = Hash(c_1 \| c_2 \| V)$, with the same hash function used in the signature generation scheme, and any additional input information.
2. Convert h to an integer e.
3. Compute $Q_B' = d_B[sG - eG_A]$ and $Q' = sG - eG_A$.
4. Compute $k_1' = KDF(Q')$ and $k_2' = KDF(Q_B')$, using the KDF specified by the domain parameters.
5. Compute $N_1' = E^{-1}(c_1, k_1')$ and $N_2' = E^{-1}(c_2, k_2')$.
6. If $N_1'$ may be recognized as a valid plaintext, i.e., it may contain the expected redundant information, or the authenticated encryption mode's decryption operation may be successful, then return $N_1'$ and VALID, else return NULL and INVALID. Similarly for $N_2'$.

It will be noted that without the second correspondent's private key, a verifier may still verify that the string $c_1 \| c_2 \| V$ was signed by the first correspondent, and recover $N_1$ from $c_1$. the second correspondent's private key may be used to recover $N_2$ from $c_2$.

It may also be possible to have signatures which may be "half-valid", meaning $c_1$ may be valid, but $c_2$ may be invalid. In this case the signature authenticates $N_1$ and V only.

The recipient correspondent of a keyed PV signature may convert it to a signature with properties similar to a traditional signature (i.e., where the message may be public and may be verified by anyone), removing the keyed aspect of the signature.

This allows messages signed by the first correspondent with the keyed PV signature scheme to be transferred from the first correspondent to the second correspondent in a non-repudiable fashion: the first correspondent cannot deny having signed a message, and the second correspondent cannot deny having converted the signature.

The second correspondent can convert a kPV signature to an unkeyed signature and transfer the entire signed message to a third party, who can then verify that:

1. the first correspondent signed both the hidden and visible parts of the message,
2. the second correspondent was the intended recipient of the message, and
3. the second correspondent has converted the signature honestly, i.e., that the revealed recovered confidential part of the message may be correct (and that failure to recover was caused by the first correspondent).

The second correspondent can output the decryption key (for the symmetric-key encryption of the confidential part of the message) and use a zero-knowledge (ZK) proof of knowledge to convince the third party that the key the second correspondent presents may be the correct one. In other words, the second correspondent convinces the third party that the decryption key was computed correctly without revealing his secret key.

Despite the use of a ZK proof, efficient, non-interactive instantiations may be possible (one such instantiation may be provided herein). The new signature may be made up of the old signature, the decryption key, and the proof of knowledge. The overhead may be three values, one group element, one element the size of the group order, and one hash digest. Since conversion may use knowledge of the second correspondent's secret key, it may not be possible for the first correspondent to create a signature and then create the converted version; only the second correspondent may perform the conversion.

It may also be possible to enable the first correspondent to convert a signature on its own, however, the result makes it clear that the second correspondent did not participate in the conversion.

Suppose, for example, the second correspondent may be the recipient of a kPV signature from the first correspondent, and that the second correspondent would like to show the confidential part of the message to the third party. Additionally, the third party should be able to verify that the first correspondent signed the confidential part of the message.

Possible applications may be forwarding kPV-signcrypted emails, or auditing electronic transactions (e.g., payments) that use keyed PV signatures. In the second application, the first correspondent or the second correspondent may reveal the hidden portion of a kPV signature to a third party in a verifiable manner, for example, to resolve a dispute.

Enabling the second correspondent to reveal $k_2'$ to the third party may not provide the desired verification. The ciphertext $c_2$ may be fixed: since it may be signed by the first correspondent, any attempt by the second correspondent to change it would be considered a forgery. A dishonest second correspondent may try and choose some $k_{(bar)}$ such that $E^{-1}(c_2, k_{(bar)}) = N_{2(bar)}$, for some $N_{2(bar)} \neq N'_2$, but still output as a valid ciphertext by the decryption algorithm (Recall that $N'_2$ may be the plaintext recovered by an honest second correspondent). Arbitrary E may not be designed so that this may be infeasible. Even assuming the second correspondent cannot find another $k_{(bar)}$ for which $E^{-1}(c, k_{(bar)})$ does not cause the verifier to abort, the first correspondent may have created her signature incorrectly, in particular she may create $c_2$ incorrectly.

For example, the first correspondent might choose $c_2$ to be a random string. The public verification of $(s, c_1, c_2, V)$ accepts, since the second correspondent's private key may be used to check $c_2$. However, the second correspondent should be able to prove to the third party that the first correspondent created the signature incorrectly, without revealing his private key. If the second correspondent reveals $k_2'$ to the third party, the third party cannot tell whether the first correspondent created $c_2$ incorrectly, or the second correspondent created $k_2'$ incorrectly. Either can cause $E^{-1}(c_2, k_2')$ to fail. Therefore, simply revealing $k_2'$ may be not enough.

Referring now to FIG. 3 a method is described for enabling the second correspondent to convert and transfer the first correspondent's keyed PV signature to the third party. In this first description we do not specify the ZK proof protocol. It may be interactive or non-interactive, and the resulting proof may or may not be transferable. By "transferable" in this setting we may refer to the third party's ability to convincingly present the proof to another party.

Given a kPV signature $(s, c_1, c_2, V)$ from the first correspondent to the second correspondent, the second correspondent's public and private key $(d_B, G_B)$, and the first correspondent's public key $G_A$, the second correspondent converts the signature using its ALU 1032 as follows:
1. Compute $e = H(c_1 \| c_2 \| V)$ (300)
2. Let $R = sG - eG_A$ (302).
3. Compute $Q_B = d_B R$ (304) and send $Q_B$ to the third party (306).
4. Prove knowledge of $d_B$ (308), such that $G_B = d_B G$ and $Q_B = d_B R$. Note that e and R may be computed from the original kPV signature (which is public). Output 'reject' (312) if the proof does not verify (30).
5. The third party may use $Q_B$ to compute $k_2 = KDF(Q_B)$ (314) and use $k_2$ to decrypt $c_2$ (316). If $c_2$ decrypts successfully (318), the third party outputs 'accept' (320), and 'reject' (322) otherwise. When $c_2$ does not decrypt successfully, the third party concludes that the first correspondent created the signature incorrectly.

The third party obtains ($N_2$ or $\perp$) and proof from the second correspondent that the first correspondent signed it.

In the case when the proof of knowledge is of non-interactive, we denote it $\pi$. The new signature may be then $(s, c_1, c_2, V, Q_B, \pi)$, and $G_A$ and $G_B$ may be used for verification. We now describe an efficient way to construct $\pi$.

Figure 4:
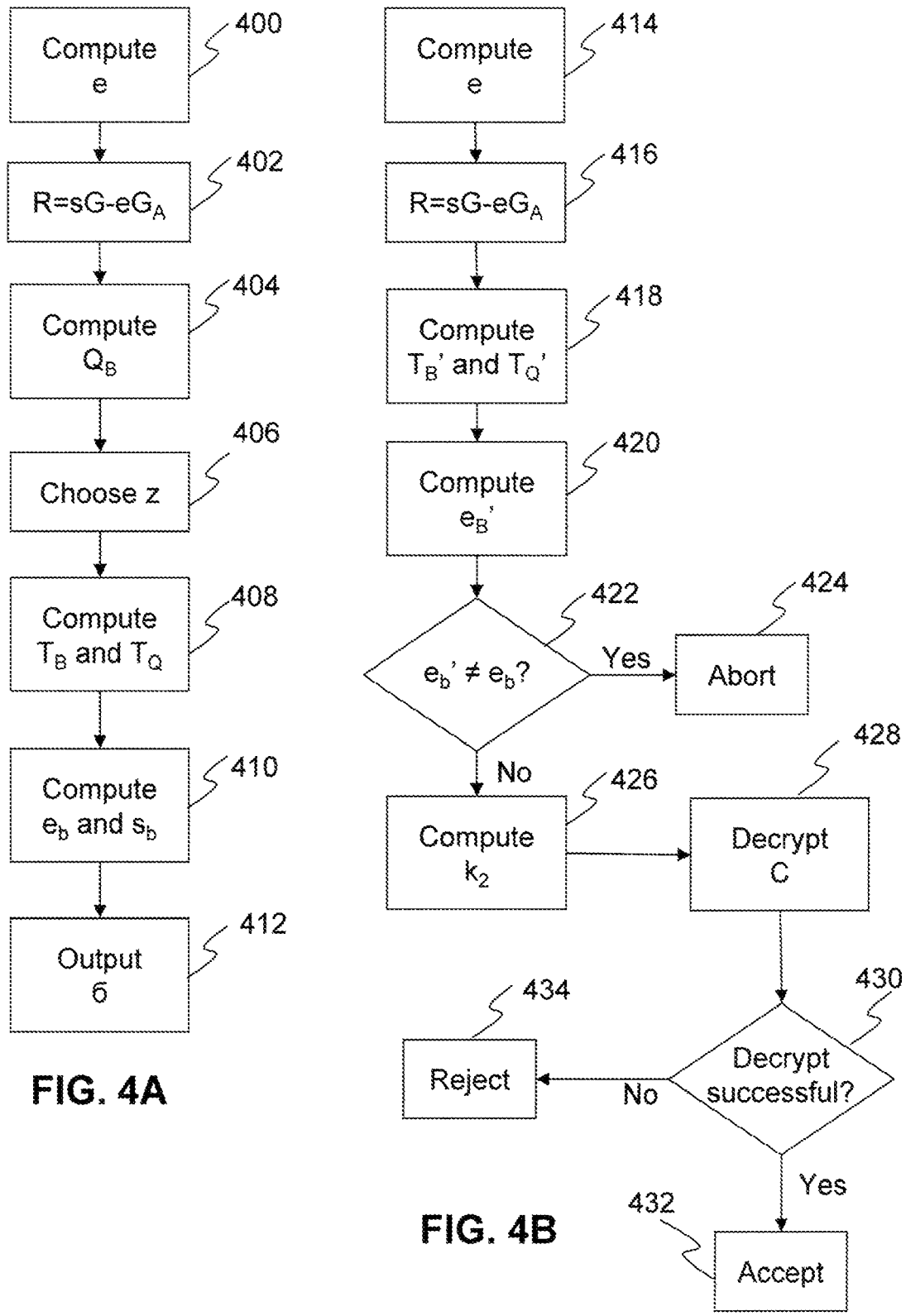
FIGS. 4A and 4B are a flowchart illustrating non-interactive proof and verification.

Referring now to FIGS. 4A and 4B, non-interactive proof and verification is now described. Given a kPV signature $(s, c_1, c_2, V)$ from the first correspondent to the second correspondent, the second correspondent' key pair $(d_B, G_B)$, and the first correspondent's public key $G_A$, the method comprises:

Proof generation using the ALU 1032 of the second correspondent, as shown in FIG. 4a is as follows:
1. Compute $e = H(c_1 \| c_2 \| V)$ (400), and let $R = sG - eG_A$ (402)
2. Compute $Q_B = d_B R$ (404).
3. Choose z (406) at random, using RNG 34, from [0, ..., n] and compute (408) $T_B = zG$ and $T_Q = zR$.
4. Compute (410) $e_b = H(s\|c_1\|c_2\|V\|Q_B\|T_B\|T_Q)$, and $s_b = z + e_b \pmod n$.
5. Output the new signature $\sigma = (s, c_1, c_2, V, Q_B, \pi = (s_b, e_b))$ to the third party (412).

Verification of $\sigma$ using the ALU 1032 of the second correspondent, as shown in FIG. 4b is as follows:
1. Compute $e = H(c_1 \| c_2 \| V)$ (414), and let $R = sG - eG_A$ (416).
2. Compute (418) $T_B = s_b G - e_b G$, and $T_Q' = s_b R - e_b R$.
3. Compute (420) $e_B' = H(s\|c_1\|c_2\|V\|T_B'\|T_Q')$, and abort (424) if $e_B' \neq e_b$ (422).
4. Compute $k_2 = KDF(Q_B)$ (426) and decrypt c (428). Accept (432) if $c_2$ decrypts successfully, reject (434) otherwise.

The second correspondent may append an additional message to be signed when creating $e_b$ (signed by him only, not the first correspondent).

The conversion described above allows the third party to forward the converted signature to anyone, since it may be verified by all.

Jakobsson et al. (see M. Jakobsson, K. Sako, and R. Impagliazzo. Designated Verifier Proofs and Their Applications. In Proceedings of EUROCRYPT'96, LNCS 1070 (1996), 143-154, incorporated herein by reference) define a primitive called designated verifier zero-knowledge proofs which may be proofs of knowledge that may only be verified by a verifier of the prover's choice (the designated verifier (DV)). Further, the DV may not convince others of the proof's validity, even if he shares his secret information. In Jakobsson et al. both interactive and non-interactive DV proof systems may be given. The intuition behind their constructions may be to change the statement being proven from "X is true" to the compound statement "X is true OR I know the DV's secret key". This may be convincing to the DV if he hasn't shared his secret key, but unconvincing to anyone else, since the DV can create such proofs. This non-transferability property of a zero-knowledge proof may also be sometimes called deniability in the literature, since the prover can deny having created a proof.

Further extensions may be possible. By encrypting $Q_B$ in the non-interactive proof and verification using the third party's public key, the values transferred to the third party will only allow the third party to view the message N and verify the signature. Whether the third party can convincingly show the message to another party still depends on the proof system the second correspondent uses to create $\pi$.

Another extension enables a correspondent to convert her own signature. Suppose now that the first correspondent has created a kPV signature (s, $c_1$, $c_2$, V) with the second correspondent as the recipient, and would like to convert it. Since the first correspondent may re-sign $M=N_1\|N_2\|V$, the purpose of this would be for the first correspondent to verifiably reveal to the third party a message she had previously sent to the second correspondent. For this extension, the first correspondent may keep the ephemeral secret, r, used when creating the signature. Referring to the notation in the keyed PV signature generation method given above, the first correspondent may reveal $Q_B=rG_B$, the Diffie-Hellman value used to derive $k_2$, the encryption key used for ciphertext $c_2$. the first correspondent may prove knowledge of r, such that $sG-eG_A=rG$ and $Q_B=rG_B$. This proof may be zero-knowledge, since revealing r allows $d_A$ to be recovered.

Upon accepting this proof, the third party computes $k_2=KDF(Q_B)$, and decrypts $c_2$, accepting it as valid if decryption may be successful. If decryption fails, clearly the first correspondent may be at fault. In practice the first correspondent could set r as the output of a pseudorandom function, keyed with her secret key. The input would consist of V and a counter. The counter may be important to ensure that no ephemeral value gets re-used. This still include the first correspondent retain some state to store the counter, but it need not be secret.

Although the above has been described with reference to certain specific implementations, various modifications thereof will be apparent to those skilled in the art without departing from the spirit and scope as outlined in the claims appended hereto. The entire disclosures of all references recited above are incorporated herein by reference.

What is claimed is:

1. A method of securely communicating a message from a first correspondent device to one or more second correspondent devices, the method comprising:
    dividing the message into a visible component, a first hidden component for a payment gateway, and a second hidden component for an issuing bank;
    encrypting the first hidden component using a public key of the payment gateway, wherein the encrypted first hidden component includes information identifying the issuing bank when decrypted using a private key of the payment gateway, and the information is used to forward the second hidden component to the issuing bank;
    encrypting the second hidden component using a public key of the issuing bank, wherein the encrypted second hidden component includes transaction details, including financial account information, when decrypted using a private key of the issuing bank;
    signing the visible component, the encrypted first hidden component, and the encrypted second component of the message using a private key of the first correspondent device;
    transmitting the message to the payment gateway; and
    receiving, in response to the message and from the payment gateway, a receipt for the transaction between the first correspondent device and the one or more second correspondent devices and including a signature by the payment gateway, wherein the receipt is verifiable by the issuing bank and the receipt comprises a visible receipt component and a hidden receipt component, the hidden receipt component including at least a portion of the transaction details.

2. The method according to claim 1, wherein the signing the message uses an Elliptic Curve Pinstov Vanstone Signatures (ECPVS) signature scheme.

3. The method according to claim 2, wherein the ECPVS signature scheme is a keyed ECPVS signature scheme.

4. The method according to claim 1, wherein the receipt further comprises a confidential component decryptable by the first correspondent providing information regarding the message.

5. A device for securely communicating a message from a first correspondent to one or more second correspondents, the device being associated with the first correspondent, the device comprising a processor configured for:
    dividing the message into a visible component, a first hidden component for a payment gateway, and a second hidden component for an issuing bank;
    encrypting the first hidden component using a public key of the payment gateway, wherein the encrypted first hidden component includes information identifying the issuing bank when decrypted using a private key of the payment gateway, and the information is used to forward the second hidden component to the issuing bank;
    encrypting the second hidden component using a public key of the issuing bank, wherein the encrypted second hidden component includes transaction details, including financial account information, when decrypted using a private key of the issuing bank;
    signing the visible component, the encrypted first hidden component, and the encrypted second component of the message using a private key of the first correspondent device; and
    transmitting the message to the payment gateway; and
    receiving, in response to the message and from the payment gateway, a receipt for the transaction between the first correspondent device and the one or more second correspondent devices and including a signature by the payment gateway, wherein the receipt is verifiable by the issuing bank and the receipt comprises a visible receipt component and a hidden receipt component, the hidden receipt component including at least a portion of the transaction details.

6. The device according to claim 5, wherein the signing the message uses an ECPVS signature scheme.

7. The device according to claim 6, wherein the ECPVS signature scheme is a keyed ECPVS signature scheme.

8. The device according to claim 5, wherein the receipt further comprises a confidential component and wherein the processor is configured to decrypt the confidential component by providing information regarding the message.

9. A non-transitory computer readable medium for securely communicating a message from a first correspondent device to one or more second correspondent devices, the computer readable medium storing instructions to cause a processor to perform operations comprising:

dividing the message into a visible component, a first hidden component for a payment gateway, and a second hidden component for an issuing bank;

encrypting the first hidden component using a public key of the payment gateway, wherein the encrypted first hidden component includes information identifying the issuing bank when decrypted using a private key of the payment gateway, and the information is used to forward the second hidden component to the issuing bank;

encrypting the second hidden component using a public key of the issuing bank, wherein the encrypted second hidden component includes transaction details, including financial account information, when decrypted using a private key of the issuing bank;

signing the visible component, the encrypted first hidden component, and the encrypted second component of the message using a private key of the first correspondent device;

transmitting the message to the payment gateway; and receiving, in response to the message and from the payment gateway, a receipt for the transaction between the first correspondent device and the one or more second correspondent devices and including a signature by the payment gateway, wherein the receipt is verifiable by the issuing bank and the receipt comprises a visible receipt component and a hidden receipt component, the hidden receipt component including at least a portion of the transaction details.

10. The computer readable medium of claim 9, wherein the signing the message uses an Elliptic Curve Pinstov Vanstone Signatures (ECPVS) signature scheme.

11. The computer readable medium of claim 10, wherein the ECPVS signature scheme is a keyed ECPVS signature scheme.

12. The computer readable medium of claim 9, wherein the receipt message further comprises a confidential component decryptable by the first correspondent providing information regarding the message.

* * * * *